United States Patent [19]

Guest, Jr. et al.

[11] Patent Number: 5,161,504
[45] Date of Patent: Nov. 10, 1992

[54] DUAL MODE ELECTRICAL SERVOACTUATOR

[75] Inventors: Philip Guest, Jr., Bloomfield Hills; Donald Haefner, Oak Park; Richard Neuman, Brighton; David Preston, Drayton Plains, all of Mich.

[73] Assignee: Eaton Corporation, Cleveland, Ohio

[21] Appl. No.: 736,659

[22] Filed: Jul. 26, 1991

[51] Int. Cl.[5] .......................................... F02D 11/10
[52] U.S. Cl. .................................. 123/361; 123/399; 180/178; 180/197
[58] Field of Search ....................... 123/352, 361, 399; 180/178, 179, 197

[56] References Cited

U.S. PATENT DOCUMENTS 4,972,817 11/1990 Wilde et al. ................ 123/361 X

Primary Examiner—Tony M. Argenbright
Attorney, Agent, or Firm—R. A. Johnston

[57] ABSTRACT

A dual mode electrically operated servo-actuator with a motorized speed reducer rotating a pair of spaced discs each having a pair of common spiral cam tracks. A sliding carrier block disposed between the discs has cam followers separately engaging the track. A bell crank is pivoted on the carrier block for attachment to a load function. In the rotary mid-position, the carrier block is centered and the servo motor is not used to enable a fixed position of the bell crank pivot. In a first mode function the motor is driven to rotate the cam for modulation about positions between the mid-position and fully clockwise position. In a second mode function the motor is driven to rotate the cam for modulation about positions between the mid-position and the fully counter-clockwise position. In a throttle actuator application the first mode is cruise control and the second mode is traction control, with the mid-position comprising normal driver operation of the throttle.

7 Claims, 6 Drawing Sheets

DUAL MODE ELECTRICAL SERVOACTUATOR

CROSS REFERENCE TO RELATED APPLICATION

This application is related to an application entitled "CLUTCHING FOR A SERVOACTUATOR", Ser. No. 736,536, filed concurrently herewith in the names of D. Haefner and D. Preston, and assigned to the assignee of the present invention.

BACKGROUND OF THE INVENTION

The present invention relates to electrically operated servo-actuators for providing mechanical movement of a mechanism in response to an electrical control signal. Servo-actuators of this type are employed in various control applications, such as, for example, throttle actuators employed for motor vehicle operation It has been proposed to provide all-electrical operation of a vehicle throttle by utilizing an electrical throttle actuator mechanism controlled electronically in response to electrical input signals generated by various operating parameters and a signal generated by the driver varying the position of the vehicle accelerator pedal. Such all-electrical control of the vehicle throttle thus eliminates the commonplace cable or linkage connection between the vehicle accelerator pedal and the vehicle engine throttle. This type of vehicle throttle control offers a high degree of sophistication of engine operational control because the electronic computer or microprocessor can provide changes in the electrical control signal, responsive to selected electrical sensory inputs, much faster than human reaction time.

However, all-electrical control of a vehicle throttle has the inherent disadvantages that failure of the electronic controller requires expensive and complicated redundancy or back-up to prevent total loss or uncontrollable vehicle motive power and particularly in the event that the microprocessor in the controller fails completely or operates in an unacceptable manner.

It has been desired to provide a system for incorporating electrical control of a vehicle throttle for certain modes of operation, as for example, traction control and cruise control where it is desirable to take advantage of the speed of response of a microprocessor-based controller. It has also been desired to maintain a mechanical cable or linkage connection between the accelerator pedal and the vehicle throttle to provide the driver with redundant control in the event of failure of the electronic controller. A system of this latter type is sometimes referred to as a throttle cable intervention system. However, where it is desired to incorporate plural mode functions in a single electrically operated electronically controlled actuator it has proven prohibitively costly and complex to employ a single actuator device which could operate in both modes and yet be compatible with a particular mechanical load. It has thus been desired to provide a way or means of combining in a single motor-driven servoactuator a dual mode function of operation for the motor driven mechanism of the servo; and, in particular, to provide such a servo for application in combining cruise control function and traction control functions in a motor vehicle throttle actuator application while retaining the mechanical interconnection of the accelerator pedal and the engine throttle.

SUMMARY OF THE INVENTION

The present invention provides an electrically operated servoactuator having dual mode functions for its mechanical output and which operates from a single motor driven speed reducer means. The servoactuator of the present invention employs a carrier block slidably mounted on a housing and has a bell crank means pivotally mounted thereon with opposite ends of the bell crank adapted for attachment to load function mechanical linkages, as for example, a cable from a vehicle accelerator pedal and a cable to a vehicle engine throttle.

The carrier block employs dual cam follower means thereon which separately engage individual first and second spiral cam tracks on a rotatable cam means comprising a pair of special cam discs rotatably mounted on the housing. The motor speed reducer means is operatively connected to drive the rotatable cam means and when the cam means is driven to a fully clockwise position the carrier block is positioned at one extreme limit of its travel by engagement of one of the cam follower means with one of the cam tracks. When the motor drives the cam means to the fully counter-clockwise position the cam follower means on the carrier block engages a second cam track and the carrier block is driven to the opposite extreme limit of its travel. When the motor is operated to drive the cam to a position substantially midway between fully counter-clockwise and clockwise, the carrier block is positioned approximately midway between its extremes of travel. In the mid-position, the servo may remain inoperative and external mechanical control of the load may be performed. Subsequent rotation of the motor in one direction in response to the first mode of operation control signal causes the cam to move the carrier block to a first limit in one direction from the mid-position; and, thereafter modulation of the motor control signal in a first mode of operation causes the carrier block to move between the mid-position and the first limit.

Rotation of the motor in the opposite direction when the carrier block is in the mid-position causes the cam to move the carrier block in the opposite direction; and, thereafter modulation of the motor control signal in a second mode of operation causes the carrier block to move between the mid-position and the second. In the fully counter-clockwise position of the rotary cam, the cam follower means is disengaged from one of the cam tracks and is engaged with the other. In the preferred form, the cam tracks comprise oppositely directed spirals formed on a pair of axially-spaced rotary cam discs.

In a vehicle throttle application of the present servoactuator, the bell crank is split to provide folding in one direction for traction control mode of operation of the vehicle throttle and rigid pivoting for the cruise control and normal modes of operation.

DETAILED DESCRIPTION

Figure 1:
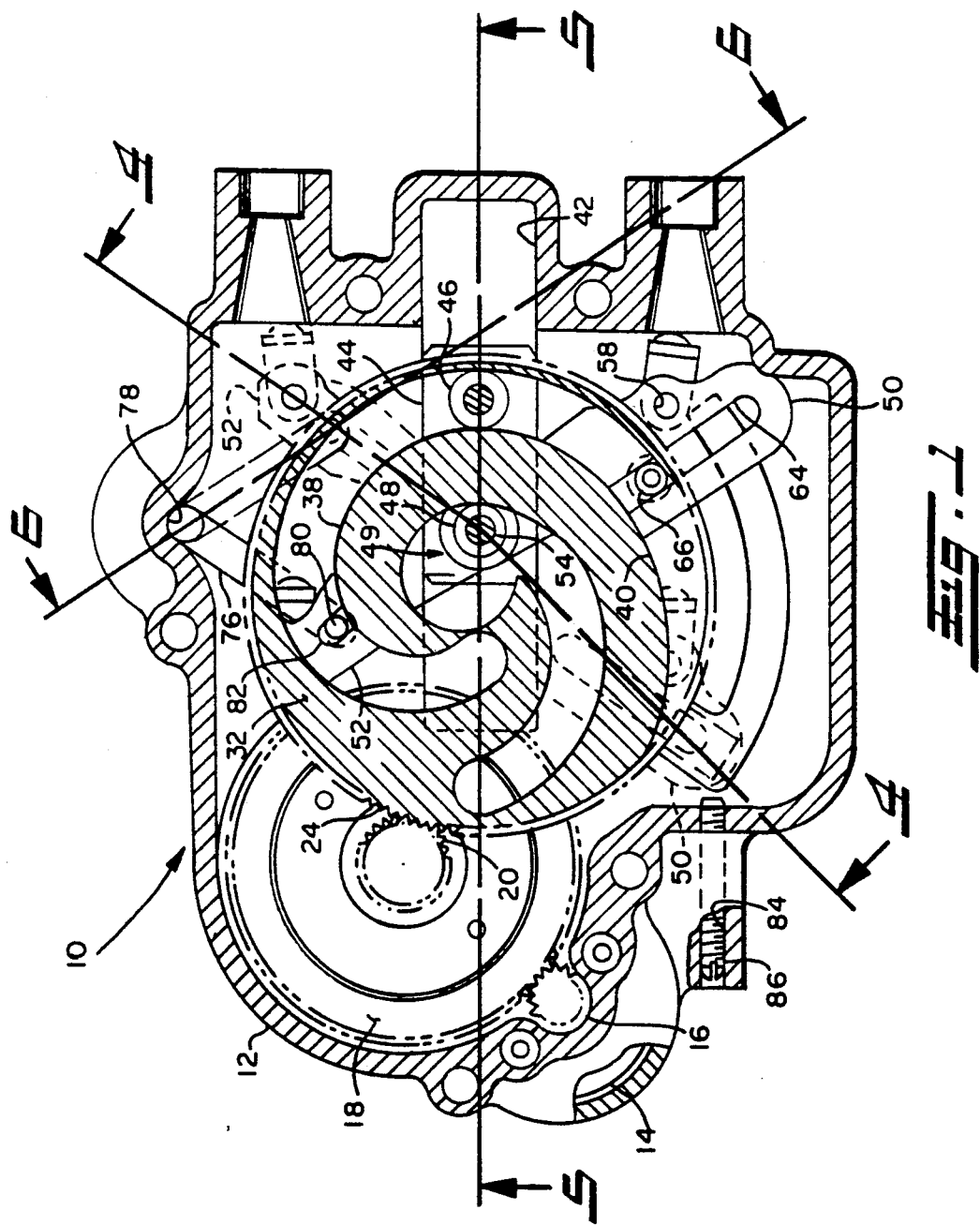
FIG. 1 is a cross-section of the servoactuator of the present invention with the rotatable cam means and carrier block in the mid-position.
Figure 4:
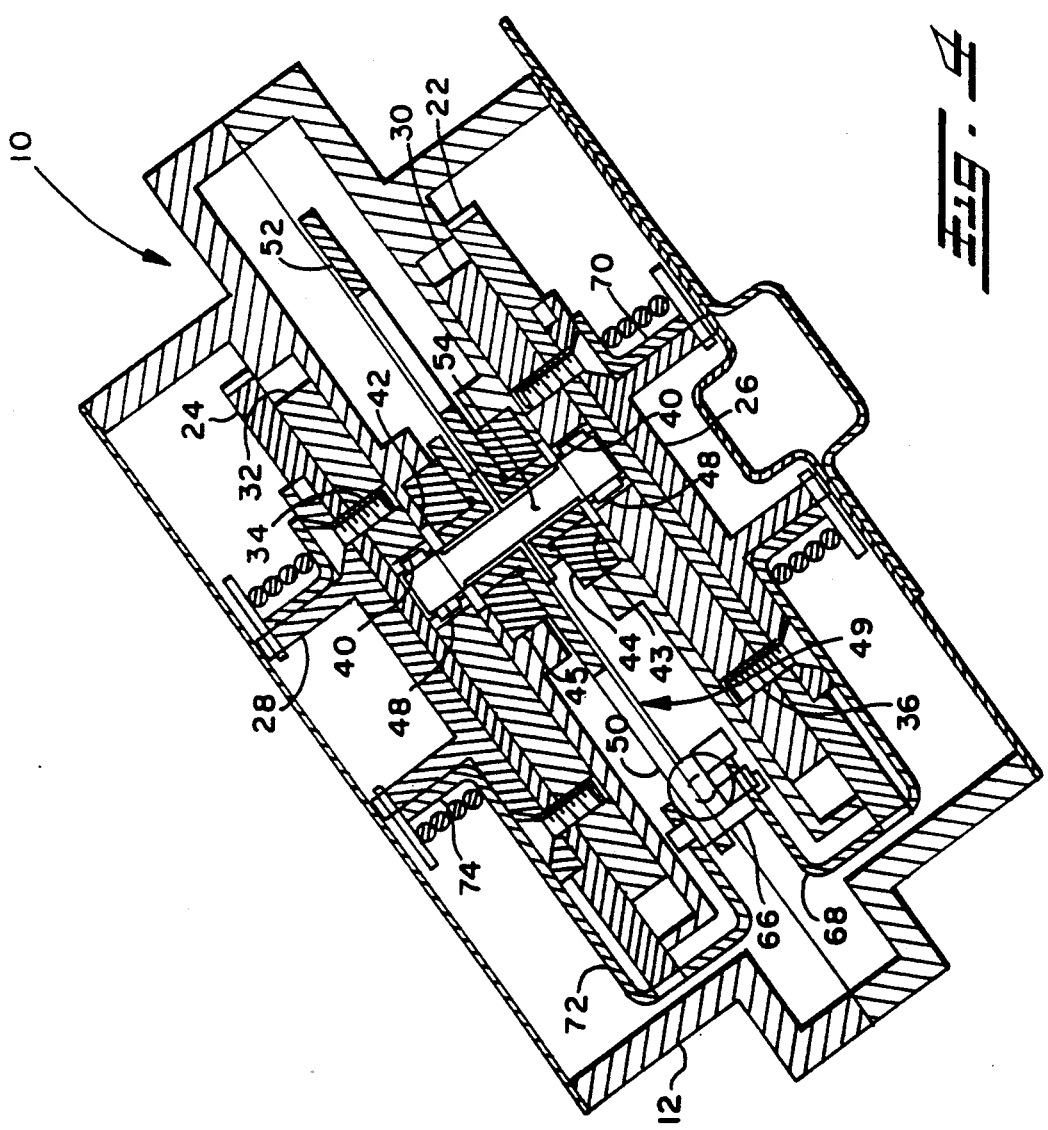
FIG. 4 is a section view taken along section-indicating lines 4—4 of FIG. 1.

Referring to FIGS. 1 and 4, the servoactuator assembly is indicated generally at 10 and has a case or housing 12 having a motor 14 mounted therein with a motor pinion gear 16 provided on the output shaft thereof.

Motor pinion 16 drivingly engages driven gear 18 which is journalled for rotation on the casing 12. Driven gear 18 has attached thereto for rotation therewith a second pinion gear 20 which drivingly engages a second second-stage driven gear which preferably comprises gears 22,24 and a duplicate thereof 24 disposed in spaced parallel relationship thereto, with only gear 24 visible in FIG. 1. It will be understood that the second-stage driven gears 22,24 are substantially larger than the second pinion 20 to complete the second stage of speed reduction from motor pinion 16.

Hubs 26,28 are attached respectively to gears 22,24, attached to the cam discs 30,32, which are journalled in the case 12.

In the presently contemplated best mode of the invention the second stage pinion is clutched (not shown) to gears 22,24 to minimize risks with respect to failure to shut off; and, preferably by the clutching mechanism shown and described in co-pending application Ser. No. 736,536, filed concurrently herewith, and entitled "CLUTCHING FOR A SERVOACTUATOR" in the names of D. Haefner and D. Preston and commonly assigned to the assignee of the present invention and which is incorporated herein by reference.

Each of the second stage driven gears 22,24 has attached thereto a cam disc denoted respectively 30,32 and secured thereon by screws 34,36 for rotation with the second stage reduction gear. Each of the cam discs 30,32 is guided for rotation on the case 12 by any suitable expedient and has a first and second spiral cam track denoted by reference numerals 38,40 in FIG. 1 for the cam disc 32 illustrated therein.

The frame 12 has a pair of guide slots denoted 42,43 provided therein, each of which has slidably received therein a carrier block 44,45, each of which has a pair of spaced cam followers 46,48 disposed on opposite sides thereof for engaging respectively the cam tracks 38,40 on each of the cam discs 30,32. It will be understood that the two carrier blocks denoted by reference numerals 44 and 45 in FIG. 4, are spaced apart sufficiently to permit a bell crank means 49 comprising lever arms 50,52 to be pivoted therebetween by a pin 54 passing through the carrier blocks 44,45, and through the cam followers 48.

Figure 2:
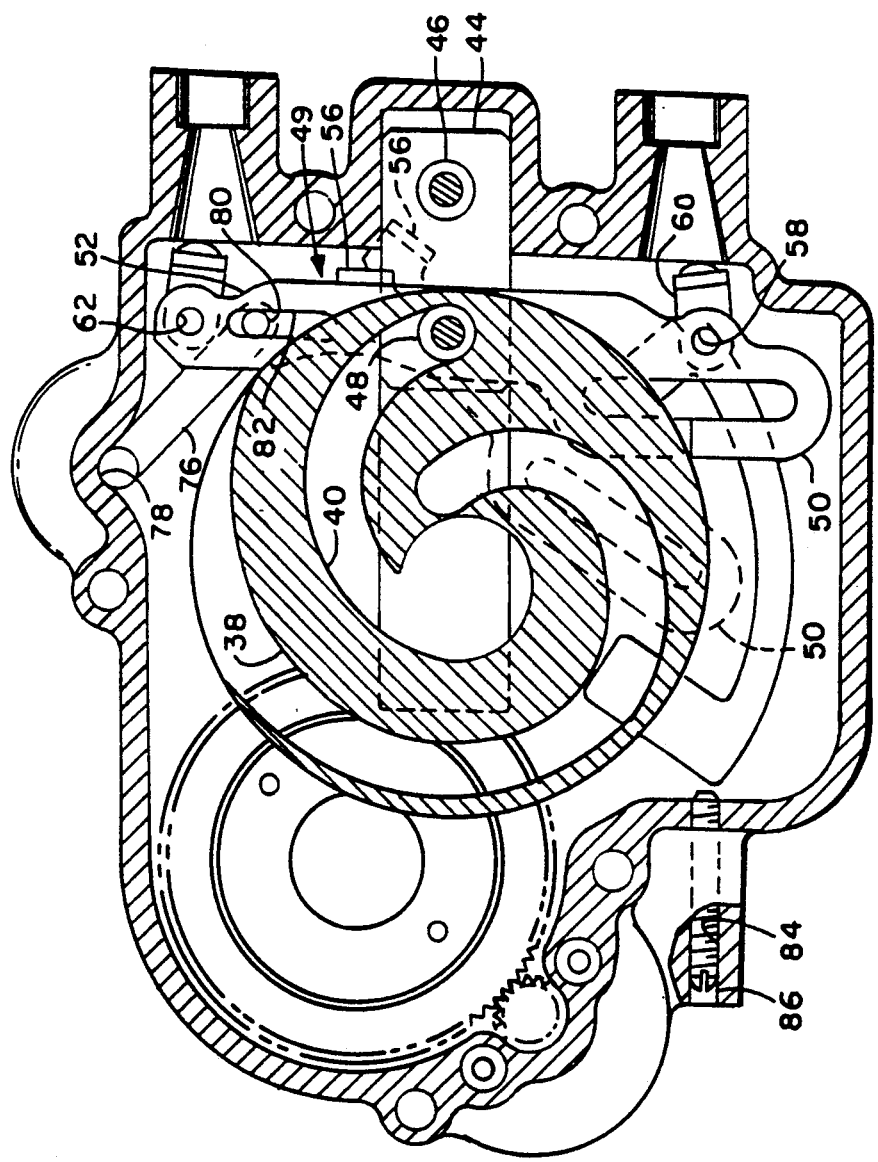
FIG. 2 is a view similar to FIG. 1 showing the cam in the fully counter-clockwise position with the carrier block at the extreme rightward limit of its movements.

Referring to FIG. 2, the bell crank lever 50 includes a flange 56 thereon which permits clockwise rotation of lever 50 with respect to the upper bell crank lever arm 52, but prevents counter-clockwise rotation beyond the position in which the lever arm 50 is aligned with the lever arm 52.

Referring to FIG. 2, the fully counter-clockwise position of the lower lever arm 50 in which position it is aligned with respect to the upper lever arm 52 is shown in solid outline. The folded or clockwise rotational position of the lower lever arm 50 with respect to the upper lever arm 52 is shown in dashed outline in FIG. 2.

The lower lever 50 of the bell crank means 49 has an aperture 58 provided therein which is adapted for attachment to an external member as, for example, a cable to an accelerator pedal by means of a suitable clevis denoted by the reference numeral 60. Similarly, the upper lever arm 52 has an aperture 62 provided therein which is adapted for attachment to an external linkage member, as for example, a cable to an engine throttle.

Referring to FIG. 1, the servoactuator is shown with the cam means which comprise two cam discs 32,30, of which only disc 32 is shown in FIG. 1, it being understood that disc 30 has the same rotational orientation and is masked by disc 32. In the orientation of FIG. 1, the cam discs 32 and 30 are shown rotated to an intermediate position between the fully clockwise and fully counter-clockwise; and, disc 30 is illustrated at approximately midway therebetween. In the position shown in FIG. 1, cam follower 48 engages the cam track 40 in the enlarged region thereof surrounding the center of the disc 32; and, cam follower 46 is engaging the inner and outer generally parallel sides of the cam track 38. The cam follower 46 thus restrains the carrier block 44 from any movement either leftwardly or rightwardly and maintains the carrier block midway between the ends of the slot 42. In the position of the carrier block 44 shown in FIG. 1, the bell crank assembly comprising lever arms 50 and 52 thus pivots about the pin 54 passing between the cam followers 48. With the carrier block 44 initially in the position shown in FIG. 1, the servoactuator is intended to be operated in a mode wherein the motor is rotated in a direction responsive to a control signal to rotate the cam disc 32 between the position shown in FIG. 1 and the fully clockwise position.

Figure 3:
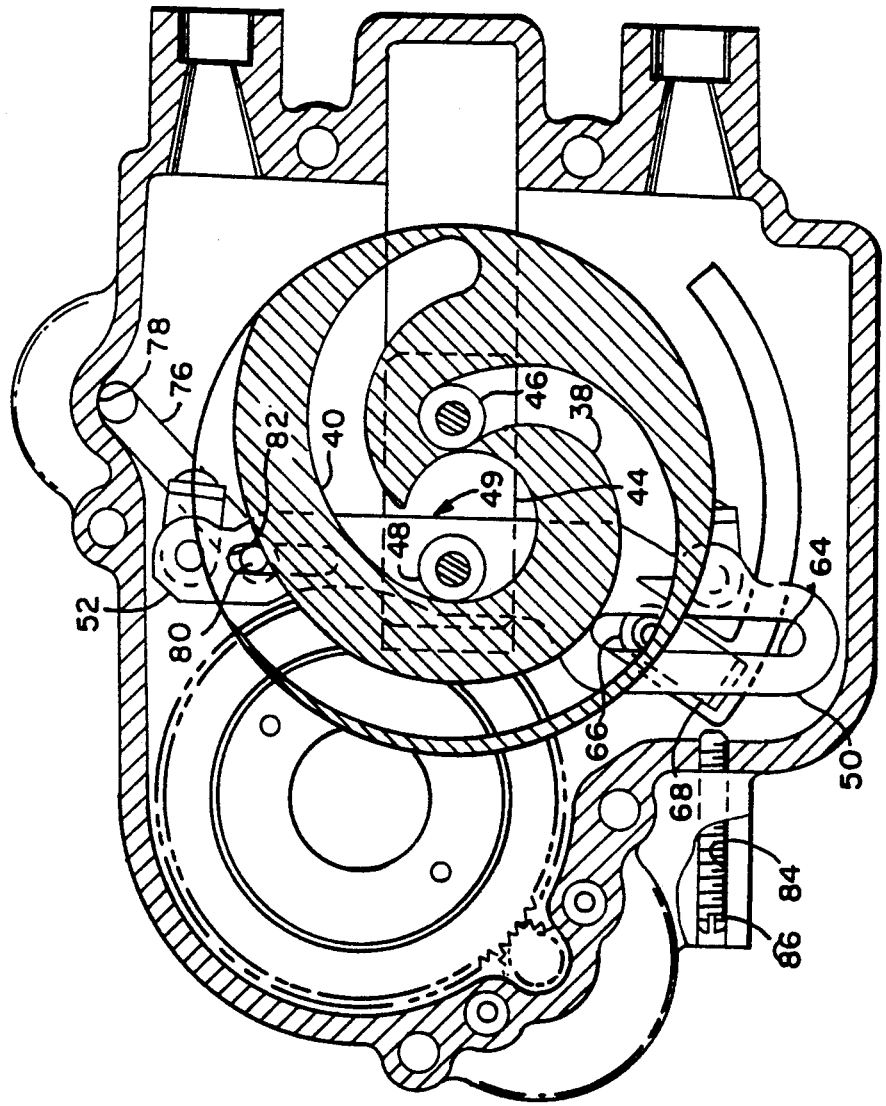
FIG. 3 is a view similar to FIG. 1 showing the rotary cam in its fully counter-clockwise position with the carrier block in the leftward extreme of its movements.

Referring to FIG. 3, the cam 32 is shown rotated to the fully clockwise position wherein the cam follower 46 has reached the end of the cam track 38 moving carrier block 44 to the fully leftward position shown in FIG. 3. It will be understood that during rotation of the cam 32 from the position shown in FIG. 1 to the position shown in FIG. 3, cam follower 48 moves freely in the enlarged central portion of cam track 40.

In an automotive throttle actuator application, the operation of the servoactuator in the position shown in FIG. 1 corresponds to normal driver mechanical control of the vehicle throttle by actuation of the accelerator pedal. The position of the lower bell crank assembly lever 50 shown in solid outline in FIG. 1 would correspond to wide open throttle and the position of the bell crank levers 50,52 shown in dashed outline in FIG. 1 corresponds to the engine idle position of the throttle.

In a throttle actuator application, in the cruise control mode, the control signal causes the motor to rotate the cam discs to some "SET" position (not illustrated) between the positions of FIG. 1 and FIG. 3 corresponding to the "SET" or desired speed, and the cruise mode control signal would effect motor and cam rotation to modulate the blocks about to the "SET" position.

In a throttle actuator application, in cruise control mode, bell crank means 49 is constrained to rotate in the counter-clockwise direction by either the application of force on arm 50 through series 60 or the contact of arm 68 with a stop means, such as a screw 86 threadedly engaging tapped hole 84. Such a stop means 86 can thus serve as a fulcrum for bell crank means 49 upon leftward movement of carrier block 44 or produced by clockwise rotation of cam disc 32 to create a leftward movement of lever arm 52 to create a linear pull on the external linkage member as, for example, an engine throttle cable attached to lever arm 52.

The position of the cam tracks and carrier block as shown in FIG. 3 represents the condition of the servo-actuator for wide open cruise control mode of operation as applied to vehicle engine throttle application. In the condition illustrated in FIG. 3, the bell crank assembly has the upper lever arm 52 shown in solid outline in the position corresponding to wide open throttle while the lower bell cranked lever arm 50 is shown in solid outline in the position corresponding to the accelerator pedal in the fully released or idle position.

In an automotive throttle actuator application of the present servoactuator, in the condition shown in FIG. 2, with the cam disc rotated fully counter-clockwise, the carrier block 44 is in a position corresponding to the full traction control operation. In the position of the cam disc and carrier block shown in FIG. 2, the bell crank assembly 49 has the upper bell crank arm 52 shown in a position in solid outline corresponding to the throttle at engine idle; and, the lower bell crank lever arm 50 is shown in solid outline in a position corresponding to the accelerator pedal at wide open throttle position. The position of the lower bell crank lever arm 50 corresponding to the accelerator pedal in the fully released or idle position is shown in dashed outline in FIG. 2. It will be understood that in the traction control mode of operation, of the servoactuator of the present invention, the servomotor would drive the cam disc between the positions shown in FIGS. 1 and 2 to modulate the throttle for traction control mode of operation irrespective of the position of the accelerator pedal selected by the driver.

Referring to FIGS. 1 through 4, the lower bell crank lever arm 50 has a slot 64 provided therein which has a pin 66 slidably received therein, which pin is connected to a rotating bracket or arm 68 which on one side of the lever arm 50 and which arm is folded around the cam disc 30 and gear 22 and has a hub formed on the end thereof, denoted by reference numeral 70, the hub being journalled for rotation on the housing 12 as illustrated in FIG. 4. A similar arm 72 engages pin 66 on the opposite side of the lever arm 50 and extends around the cam disc 32 and gear 24 and has the end thereof formed in a hub 74 which is journalled on the housing 12 for permitting rotation of the arm 72 thereon.

A pivot link 76 is pivoted about a recess 78 and the link 76 has a pin 80 formed on the end thereof opposite recess 78 which pin 80 is slidably received in a slot 82 formed in the upper bell crank lever 52.

Figure 5:
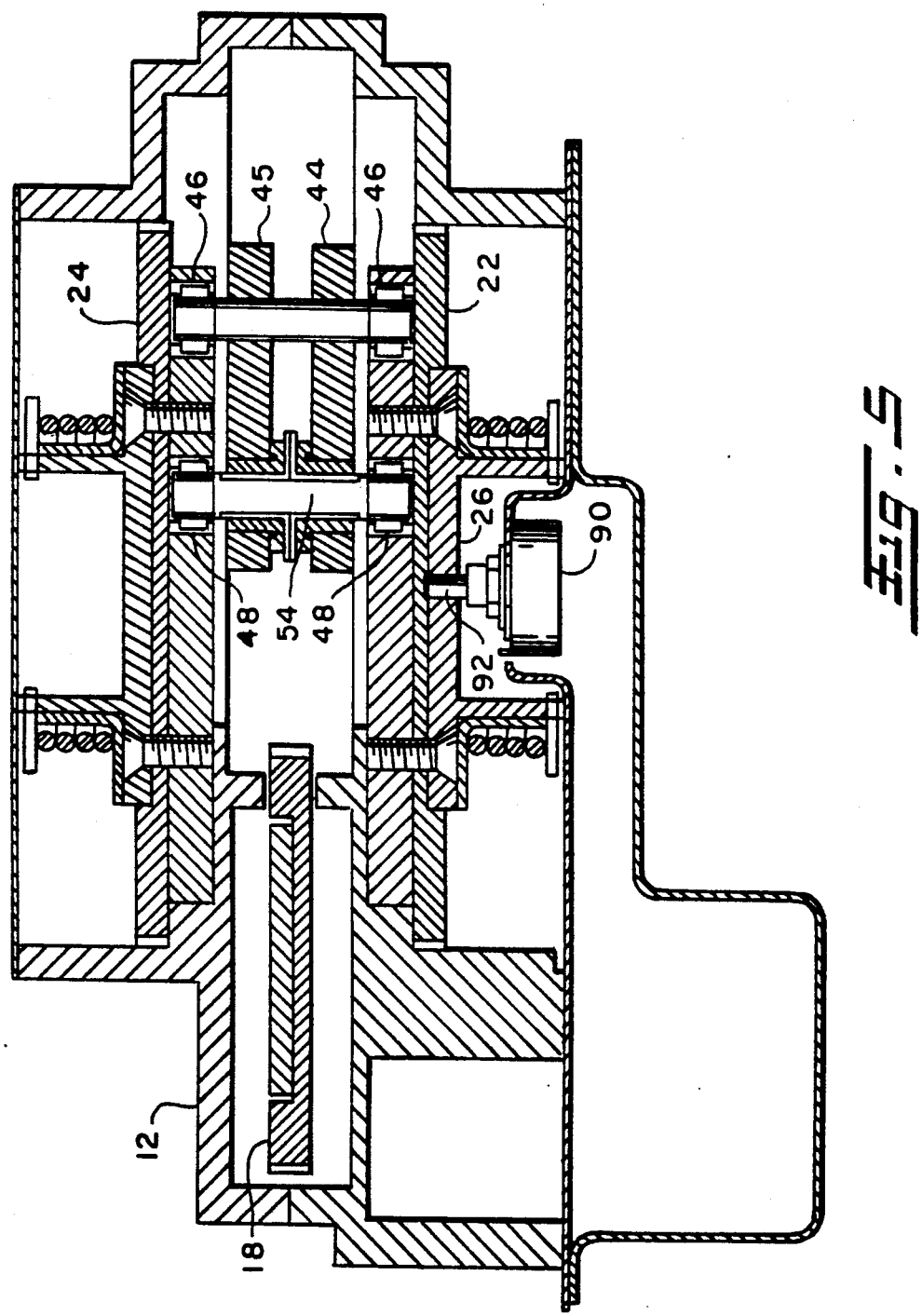
FIG. 5 is a section view taken along section-indicating lines 5—5 of FIG. 1; and, FIG. 6 is a section view taken along section-indicating lines 6—6 of FIG. 1.
Figure 6:
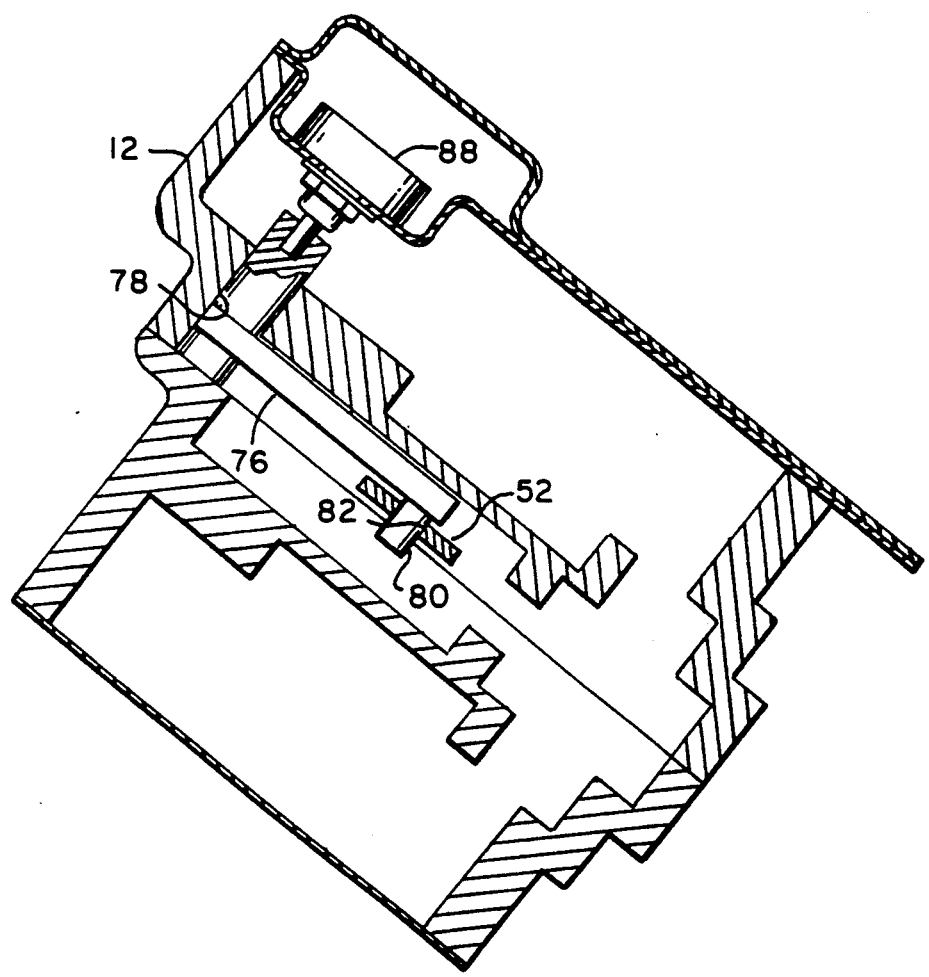

Referring to FIGS. 1, 5, and 6, pivot link 76 is attached to and drives a position sensor means 88, such as a rotary potentiometer at recess 78 which indirectly describes the position of an externally attached member, such as a throttle cable, by measurement of the position of arm 52 through pin 80 riding in slot 82 with the throttle cable attached to arm 52.

Referring to FIG. 5, a cam position feedback means, in the form of potentiometer 90 has the shaft 92 thereof connected for rotation with cam disc hub 26 to provide an electrical indication of the rotary position of the discs 30,32.

Pin 66 applies a bias or retarding force on the bell crank arms as required to provide proper operation of the servo-actuator in the mode of operation wherein the normal spring or load forces are relaxed on the apertures 58,62 as, for example, in the traction control mode of operation. This may be readily accomplished by spring loading or biasing the arms 72,68 to provide or retard rotation thereof with respect to the case or housing 12.

The present invention thus provides an electrically operated servoactuator having dual modes of operation for providing an output or connection to a load linkage. The servoactuator of the present invention utilizes a motorized speed reducer to effect rotation of cam discs having spiral tracks for engaging spaced followers on a slidable carrier block upon which a bell crank assembly is pivotally mounted. The bell crank assembly is adapted for pivotally attachment to force output linkages. In a first mode of operation, the motorized speed reducer modulates movement of the carrier block between a central and extreme limit position in one direction; and, one of the dual cam tracks engages one of the cam followers for moving the carrier block accordingly.

In a second mode of operation the motorized speed reducer modulates movement of the cam discs to effect engagement of the second cam track with the second cam follower to move the carrier block between a central position and an opposite limit position, and to modulate about positions therebetween during which movement the first cam track is disengaged from the first cam follower. For vehicle engine throttle control applications, the bell crank assembly has first and second lever portions which are permitted to move pivotally with respect to each other in one direction of rotation but act as a fixed rigid bell crank in rotation of one with respect to the other in the opposite direction. In automotive throttle control applications of the present servoactuator, the first mode of operation may correspond to vehicle cruise control functions; and, the second mode of operation may control throttle movement for traction control mode of operation.

When the motorized speed reducer is driven to rotate the cam discs to position the carrier block midway between its extreme limit, an automotive throttle application, the servo-actuator is left inoperative to provide a normal accelerator control mode of operation by the vehicle operator.

Although the present invention has hereinabove been described with respect to the illustrated embodiments, it will be understood that the invention is capable of modification and variation and is limited only by the scope of the following claims.

We claim:

1. An electrically operated throttle servo-actuator for combined cruise and traction control comprising:
    (a) housing means having motor means including speed reducing means and operable for forward and reverse direction rotation mounted thereon;
    (b) a carrier member disposed for movement on said housing means, said carrier member having bell crank means pivoted thereon, said bell crank means adapted for connection to a control member cable on one side of said pivot and adapted for connection to a throttle on the opposite side of said pivot, said carrier member having first and second cam followers thereon;
    (c) cam means mounted for rotary movement on said housing means by said motor and speed reducing means and movable between a fully clockwise and a fully anti-clockwise position with respect to said housing means, said cam means defining thereon a first cam track engageable with said first cam follower and second cam track engageable with said second cam follower, said first and second cam tracks movable upon said rotary movement of said cam means, said first cam track operable in said fully clockwise position of said cam means to engage said first cam follower and move said carrier member to and maintain a limit position in one direction, and operable in said fully anti-clockwise position to cause said second cam track to engage said second cam follower and disengage said first cam follower from said first cam track and move and maintain said carrier member to an opposite limit position and maintain said cam means operable, upon rotary movement to an intermediate position, to cause said first cam track to engage said first cam follower and move and maintain said carrier member at a point intermediate said limits, wherein said motor means is operative upon receipt of a cruise control mode signal to move said cam means between said intermediate and fully clockwise positions and upon receipt of a traction control mode signal to move said cam means between said intermediate and said fully anti-clockwise positions.

2. The servo-actuator defined in claim 1, wherein said first and second cam tracks have a generally spiral configuration.

3. The servo-actuator defined in claim 1, wherein said bell crank means includes first and second oppositely disposed levers commonly pivoted on said carrier member, said first lever operable to rotate in one direction with respect to said second lever, and upon rotation in the opposite direction to be fixed with respect to said second lever.

4. The servo-actuator defined in claim 1, wherein said cam means includes pair of axially spaced rotary discs, each having corresponding first and second spiral cam tracks formed therein, and said first and second cam followers, each including a pair of oppositely disposed projections extending from said slider block.

5. The servo-actuator defined in claim 1, wherein said cam means includes a pair of rotatably mounted discs disposed in generally axially spaced parallel arrangement.

6. An electrically operated servo-actuator for dual mode mechanical function in response to an electrical control signal, said servo-actuator comprising:
(a) housing means;
(b) motor means associated with said housing means and operable for providing shaft rotation selectively in opposite directions in response to said control signal;
(c) cam means mounted for rotary movement on said housing means between a fully clockwise and a fully counterclockwise position in response to said motor shaft rotations, said cam means including means defining a first and second cam track;
(d) carrier means disposed for movement on said housing means between first and second limit positions, said carrier means including means defining first and second cam followers, said first cam follower engageable with said first cam track and said second cam follower engageable with said second cam track;
(e) bell crank means mounted on said carrier means for pivotal movement with respect thereto, said bell crank means adapted for connection to at least one external load function member, wherein upon rotation of said cam means to fully counterclockwise position said first cam follower is engaged with said first cam track and said carrier means is moved to said first limit position and said second cam follower is disengaged with said second cam track, upon rotation of cam means to said fully clockwise position said second cam follower is engaged with said second cam track and said carrier means is moved to said second limit position, and upon rotation of said cam means to a position intermediate said fully clockwise and counterclockwise positions said second cam follower engages said second cam track and said carrier means is movable to a position intermediate said first and second limit positions; and,
(f) said cam means operable in one of said dual modes to move between said intermediate position and said fully clockwise position and in the other of said dual modes to move between said intermediate and said fully counterclockwise positions.

7. The servo-actuator defined in claim 6, wherein said cam means comprises a pair of axially spaced rotating discs with a first and second cam track on each disc.

* * * * *